(12) United States Patent
Takizawa et al.

(10) Patent No.: US 7,308,791 B2
(45) Date of Patent: Dec. 18, 2007

(54) HYDRAULIC DISC BRAKE LEVER ASSEMBLY

(75) Inventors: Shinichi Takizawa, Osaka (JP); Etsuyoshi Watarai, Osaka (JP); Tatsuya Matsushita, Osaka (JP)

(73) Assignee: Shimano Inc. (JP)

( * ) Notice: Subject to any disclaimer, the term of this patent is extended or adjusted under 35 U.S.C. 154(b) by 0 days.

(21) Appl. No.: 11/061,358

(22) Filed: Feb. 18, 2005

(65) Prior Publication Data

US 2006/0185360 A1    Aug. 24, 2006

(51) Int. Cl.
*B60T 11/00*    (2006.01)
*B60T 13/00*    (2006.01)

(52) U.S. Cl. .................. 60/547.1; 60/562; 188/344

(58) Field of Classification Search ........... 60/547.1, 60/576, 562; 91/508, 521, 524; 92/113; 188/344
See application file for complete search history.

(56) References Cited

U.S. PATENT DOCUMENTS

| | | | |
|---|---|---|---|
| 3,899,057 A * | 8/1975 | Carre | 188/344 |
| 3,935,930 A | 2/1976 | Kine | |
| 4,475,338 A * | 10/1984 | Gaiser | 60/562 |
| 4,494,800 A | 1/1985 | Hayashi | |
| 4,560,049 A | 12/1985 | Uchibaba | |
| 4,840,082 A | 6/1989 | Terashima | |
| 4,865,164 A * | 9/1989 | Kaneda | 188/344 |
| 5,676,021 A | 10/1997 | Campagnolo | |
| 6,119,821 A | 9/2000 | Chiang | |
| 6,244,207 B1 | 6/2001 | Chen | |
| 6,457,378 B2 | 10/2002 | Hatakoshi | |
| 6,491,144 B2 | 12/2002 | Ueda et al. | 188/269 |
| 6,527,303 B2 | 3/2003 | Kariyama et al. | 285/249 |
| 6,804,961 B2 | 10/2004 | Lumpkin | |
| 6,883,647 B1 | 4/2005 | Wen | |
| 2002/0020246 A1 | 2/2002 | Campagnolo | |
| 2003/0121736 A1 | 7/2003 | Lumpkin | |
| 2003/0121739 A1 | 7/2003 | Lumpkin | 188/344 |

FOREIGN PATENT DOCUMENTS

| | | |
|---|---|---|
| DE | 20011368 | 11/2000 |
| DE | 100 17 198 A1 | 10/2001 |
| DE | 100 17 199 A1 | 10/2001 |
| EP | 0173513 A2 | 3/1986 |
| EP | 0405945 A2 | 1/1991 |
| EP | 0 417 982 A2 | 3/1991 |

(Continued)

OTHER PUBLICATIONS

Office Action dated Aug. 16, 2007 for U.S. Appl. No. 11/156,501 - Examiner Pamela Rodriguez.

*Primary Examiner*—Thomas E. Lazo
(74) *Attorney, Agent, or Firm*—Jeffer Mangels Butler & Marmaro, LLP

(57) ABSTRACT

A brake lever assembly for actuating a hydraulic disc brake system is shown and described. The brake lever assembly provides two-stage braking by operatively connecting a lever to first and second pistons contained in a master cylinder. The first and second pistons are operatively connected to one another such that they move together until the first piston reaches a threshold distance from a top end of the master cylinder, after which the second piston moves with respect to the first piston.

11 Claims, 6 Drawing Sheets

FOREIGN PATENT DOCUMENTS

| | | |
|---|---|---|
| EP | 0792795 A2 | 9/1997 |
| EP | 0893337 A2 | 1/1999 |
| EP | 1514791 A1 | 3/2005 |
| EP | 1526066 A2 | 4/2005 |
| JP | 08 114244 A | 5/1996 |
| JP | 2002068067 | 3/2002 |
| WO | WO1994/021510 A | 9/1994 |
| WO | WO99/55567 A | 11/1999 |

* cited by examiner

HYDRAULIC DISC BRAKE LEVER ASSEMBLY

FIELD OF THE INVENTION

The present invention relates hydraulic disc brakes, and more particularly, to a hydraulic disc brake lever assembly preferably for a bicycle.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or back wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

When operating hydraulic disc brake systems, no braking will occur until the brake pads come into contact with the rotor. Thus, there is a "dead band," as the rider begins to contract the brake lever during which no braking occurs. To compensate for the dead band, riders may initially contract the brake lever quickly to obtain pad to rotor contact and then more slowly to increase the frictional resistance to the desired level. As a result, braking is not smooth. Thus, a need has arisen for a hydraulic disc brake lever which addresses the foregoing problems.

SUMMARY OF THE PREFERRED EMBODIMENTS

According to a first aspect of the present invention, a master cylinder assembly is provided. The master cylinder assembly comprises a master cylinder having a length defining an axis, a top end and a bottom end. A first piston is disposed in and movable within the master cylinder, and a second piston is disposed in and movable within the master cylinder. The master cylinder defines a threshold distance along the axis from the top end of the master cylinder. The first piston preferably defines a distance along the axis from the top end of the master cylinder. The second piston is preferably operatively connected to the first piston. When the distance from the first piston to the top end of the master cylinder is at least the threshold distance, the second piston is preferably movable with respect to the first piston.

In a preferred embodiment, when the distance from the first piston to the top end of the master cylinder is less than the threshold distance, the second piston is not movable with respect to the first piston. In another preferred embodiment, the first piston has an opening, at least a portion of the second piston is disposed in the opening, and when the distance from the first piston to the top end of the master cylinder is at least the threshold distance, the second piston is movable within the opening.

In accordance with yet another preferred embodiment, the second piston has a first piston engagement surface, the first piston has a second piston engagement surface, and the second piston engagement surface engages the first piston engagement surface when the distance from the first piston to the top end of the master cylinder is less than the threshold distance.

In accordance with other preferred embodiments, the master cylinder comprises a first fluid containing region having a fluid outlet, and the first piston, second piston, and master cylinder define a second fluid containing region. When the distance from the first piston to the top end of the master cylinder is less than the threshold distance, the first fluid containing region is in fluid communication with the second fluid containing region. In accordance with still other preferred embodiments, when the distance from the first piston to the top end of the master cylinder is at least the threshold distance, the first fluid containing region is substantially not in fluid communication with the second fluid containing region.

In accordance with another aspect of the present invention, a master cylinder assembly is provided which has a top end, a bottom end, and a length. The master cylinder defines a first movement region along a first portion of its length. The master cylinder assembly preferably comprises a master piston assembly comprising first and second pistons which are disposed in and movable within the master cylinder. In a preferred embodiment, when the master piston assembly is located within the first movement region, the first piston is movable together with the second piston, and when the master piston assembly is at least partially outside of the first movement region, the second piston is moveable with respect to the first piston.

In other preferred embodiments, the master cylinder further comprises a first lengthwise region along a second portion of its length having a first cross-sectional area and a second lengthwise region along a third portion of its length having a second cross-sectional area, and the first cross-sectional area is greater than the-second cross-sectional area. In yet other preferred embodiments, a first biasing device is positioned between the top end of the master cylinder and the first piston, wherein the first biasing device biases the first piston away from the top end of the master cylinder. In still other preferred embodiments, the first and second lengthwise regions are shaped to cooperatively define a lip.

In accordance with another aspect of the present invention, a hydraulic disc brake lever assembly is provided. The assembly comprises a housing and a lever connected to the housing. The lever preferably has a neutral position, a first actuating position, and a second actuating position with respect to the housing. First and second pistons are also disposed within the housing and operatively connected to the lever. In a preferred embodiment, the movement of the lever from the neutral position to the first actuating position causes the first and second pistons to move together, and the movement of the lever from the first actuating position to the second actuating position causes the second piston to move with respect to the first piston.

In accordance with another aspect of the present invention, a master cylinder assembly is provided which comprises a master cylinder, first and second pistons disposed in the cylinder and a means for selectively causing the first and second pistons to move together within the master cylinder and for causing one of the first and second pistons to move with respect to the other of the first and second pistons.

In accordance with a further aspect of the present invention, a hydraulic brake lever system is provided. The system comprises a lever having a range of travel comprising first and second regions and a master cylinder assembly. The master cylinder assembly has hydraulic fluid contained therein and a fluid exit port. The lever is operatively connected to the master cylinder assembly. In a preferred embodiment, when the lever is in the first region, moving the lever a distance delivers a first volume of hydraulic fluid from the exit port and when the lever is in a second region, moving the lever the distance delivers a second volume of fluid from the exit port, and the first volume is greater than the second volume.

The present invention is applicable to all types of devices and is not limited to bicycles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
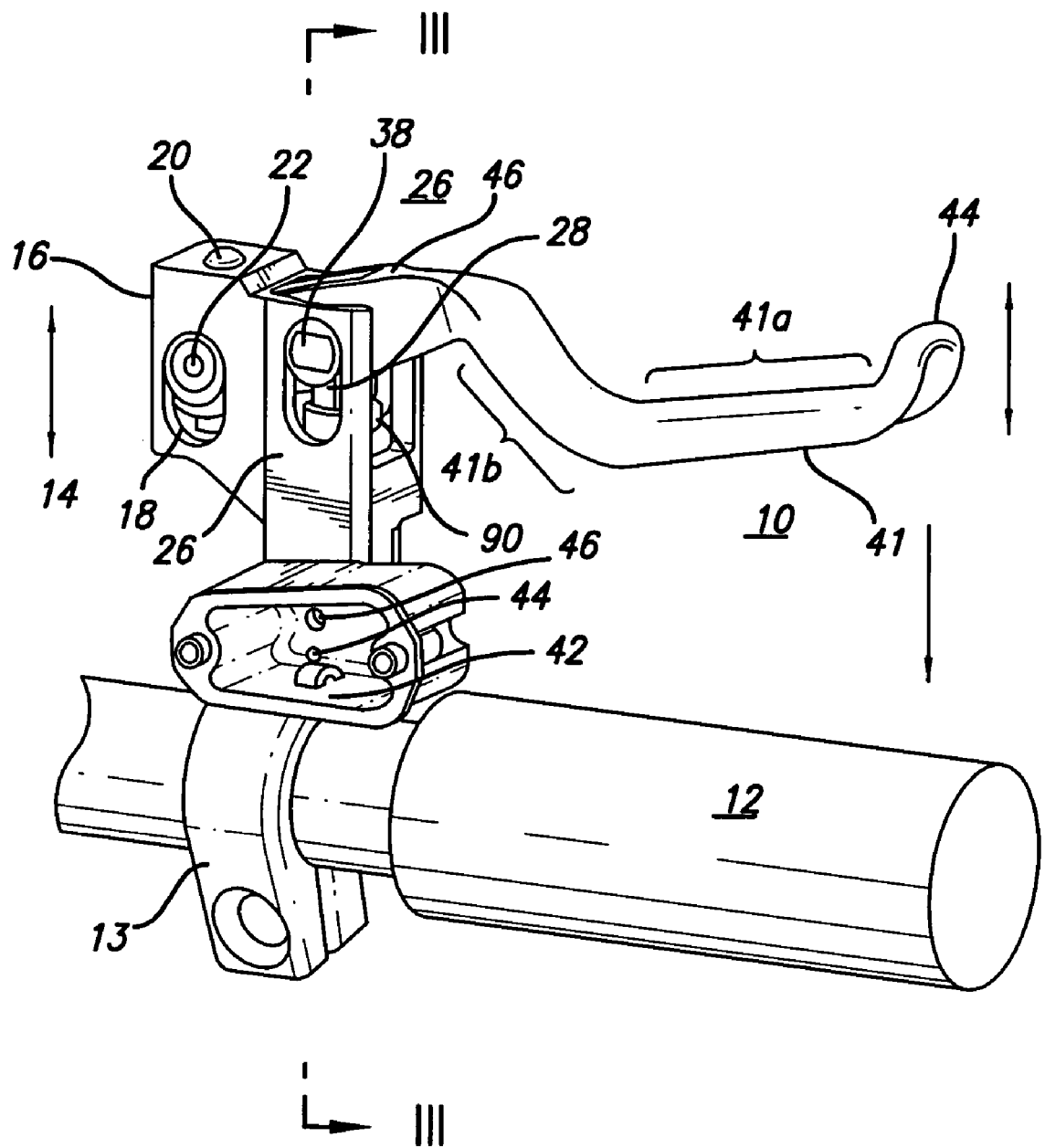
FIG. 1 is a first perspective view of a hydraulic disc brake lever assembly in accordance with a preferred embodiment of the present invention.

Referring to FIG. 1, a preferred embodiment of a bicycle brake lever assembly 10 is described. Brake lever assembly 10 is preferably a hydraulic brake lever assembly operatively connected to a hydraulic disc brake system.

Figure 2:
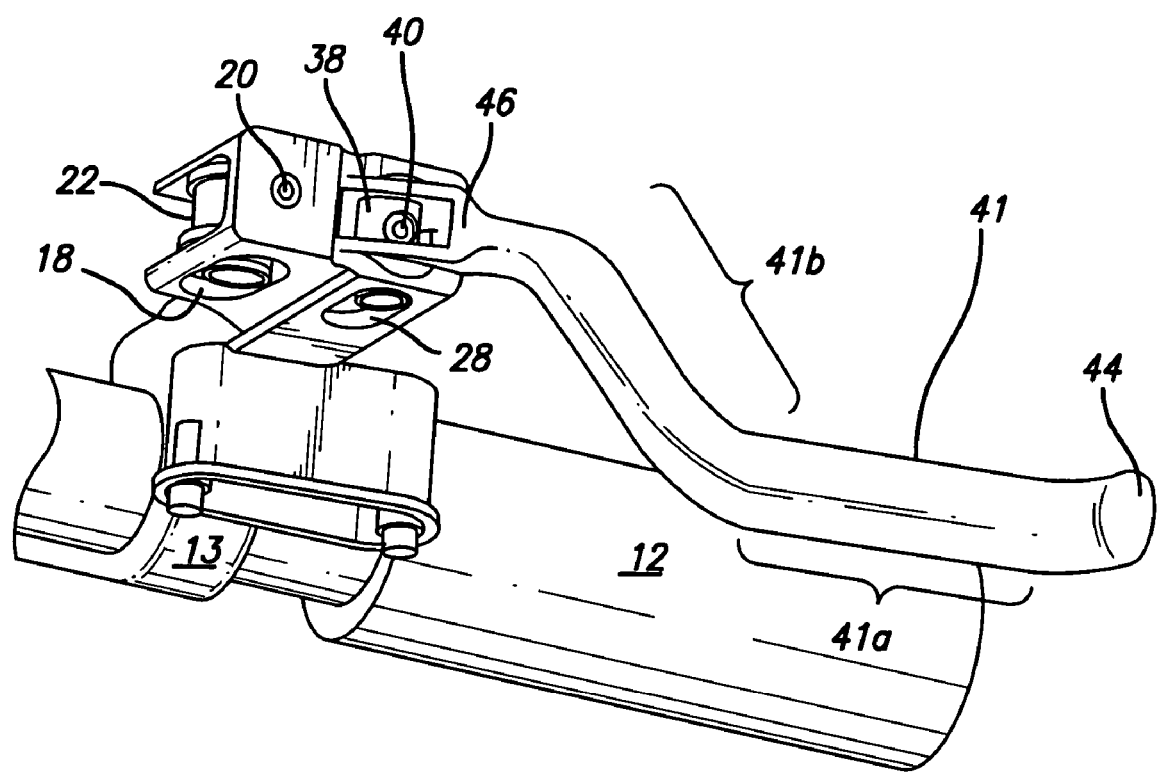
FIG. 2 is a second perspective view of the hydraulic disc brake lever assembly of FIG. 1.

As shown in FIGS. 1 and 2, brake lever assembly 10 is preferably attached to a bicycle handlebar 12 by a clamp 13 or other suitable attachment mechanism. Brake lever assembly 10 generally includes a housing 14 having a first section 16 and second section 26 and also includes a brake lever 41.

Brake lever 41 is preferably an elongated member which includes a distal end 44 that is shaped to project away from handle bar 12. Lever 41 also includes proximal end 46 which engages housing 14. In an area lying between proximal end 46 and distal end 44, a relatively flat region 41a is provided which the bicycle rider uses to grip lever 10. Sloping transition 41b connects relatively flat region 41a to proximal end 46. It is preferred that sloping transition 41b and distal end 44 both project away from relatively flat region 41a to aid in retaining the rider's hand against lateral movement along the length of lever 41.

First section 16 of housing 41 is preferably configured to facilitate pivotal movement of lever 41. In a preferred embodiment, first section 16 includes a pair of slots 18, such as ovular slots or other suitable elongated slots, (only one of which is visible in FIG. 1) on opposite sides of housing 14. Lever 41 is preferably forked at its proximal end 46 (see FIG. 2). On each forked portion, an aperture is provided. The apertures are aligned with one another to define a spaced apart pair of aligned apertures.

Pivot member 22 is also retained within housing first section 16 by engaging slot pair 18 and by an adjustable fastener such as adjustment screw 20. Pivot member 22 is preferably cylindrical in shape and has a longitudinal axis which defines a pivot axis about which brake lever 41 is rotatable.

As best shown in FIG. 2, adjustable fastener or adjustment screw 20 is disposed within first section 16 in a direction that is generally perpendicular to the longitudinal axis of pivot member 22. The adjustable fastener is preferably configured to allow the vertical position of pivot member 22 to be varied within slot pair 18. The head of adjustment screw 20 is preferably accessible via a hole in the top of first section 16 and configured to rotate with respect to the housing without advancing axially. This can be achieved by a number of known means such as the use of a Belleville washer which axially biases the head of adjustment screw 20 with respect to housing 14. To allow it to move the pivot member 22 vertically, adjustment screw 20 preferably has a threaded end which more preferably engages a complementary internally threaded hole in pivot member 22. Thus, according to this embodiment, as the adjustment screw 20 is rotated, it causes the pivot member to displace axially within slot pair 18.

As can be seen in FIGS. 1 and 2, by adjusting the vertical position of pivot member 22 in housing first section 16, the range of travel of lever 41 (i.e., the range of movement of lever 41 with respect to handlebar 12) may be adjusted. When pivot member 22 is in the position shown in FIG. 1, lever 41 operates within a minimum range of travel. However, when pivot member 22 is at the bottom of slot pair 18, lever 41 operates within a maximum range of travel.

Housing 14 also preferably includes second section 26 which houses a preferred embodiment of a master cylinder assembly 30 (not shown in FIGS. 1–2). As with first section 16, second section 26 includes a pair of aligned slots 28 on opposite sides of housing 14 (shown as 28a and 28b in FIGS. 3–5). The forked portion of lever proximal end 46 includes a pair of spaced apart and aligned apertures which are aligned with slot pair 28. The apertures and slot pair 28 both receive a actuating member 38. The engagement of actuating member 38 with slot pair 28 and the lever apertures aids in retaining lever 41 within housing 14 and actuating master piston assembly, as described below. In addition, a fastener 40, such as a screw or bolt, is preferably provided to aid in connecting actuating member 38 to master cylinder assembly 30.

Figure 3:
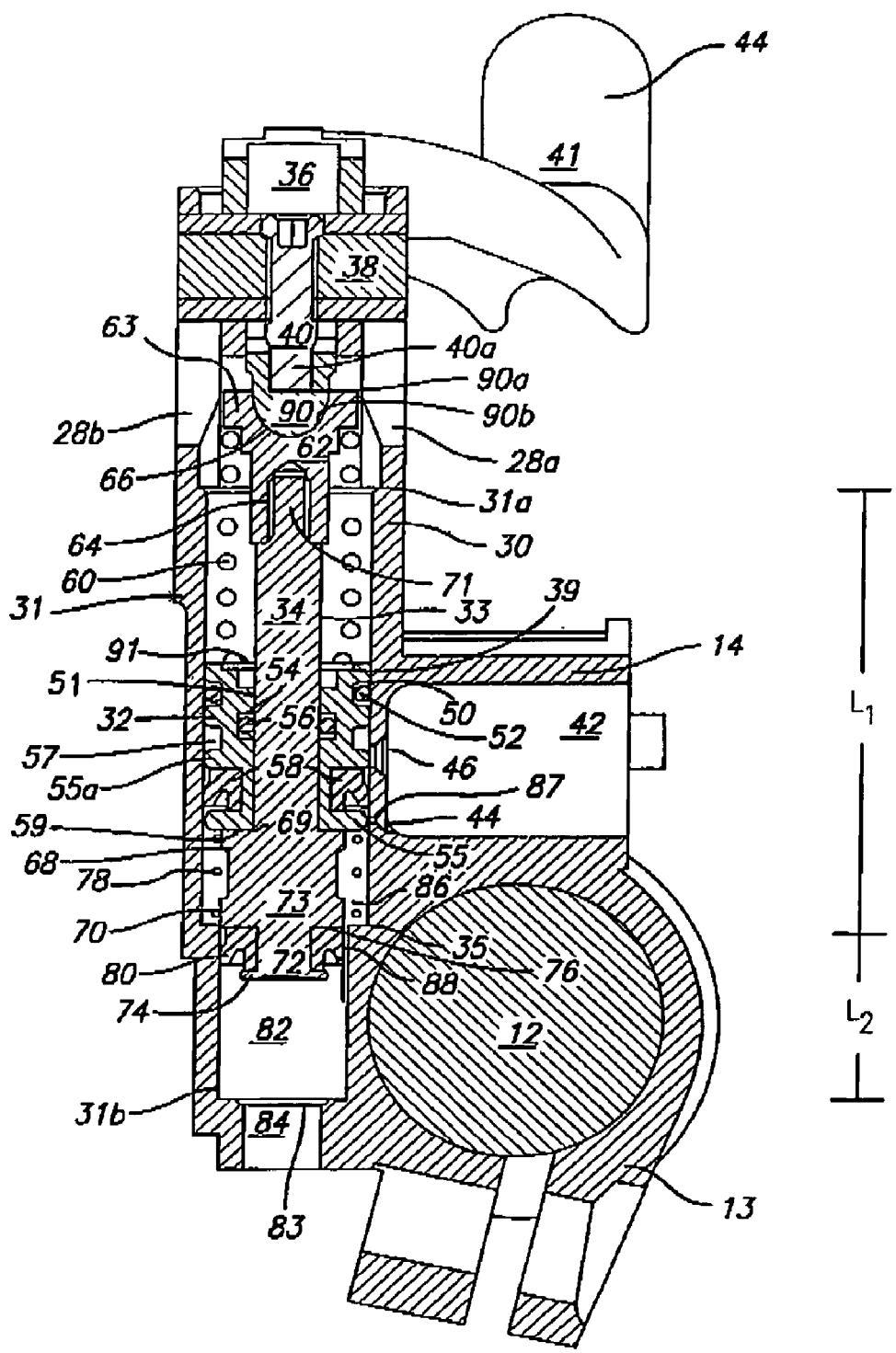
FIG. 3 is a cross-sectional view of the hydraulic disc brake lever assembly of FIG. 1 taken along line III—III with the lever in a neutral position.
Figure 4:
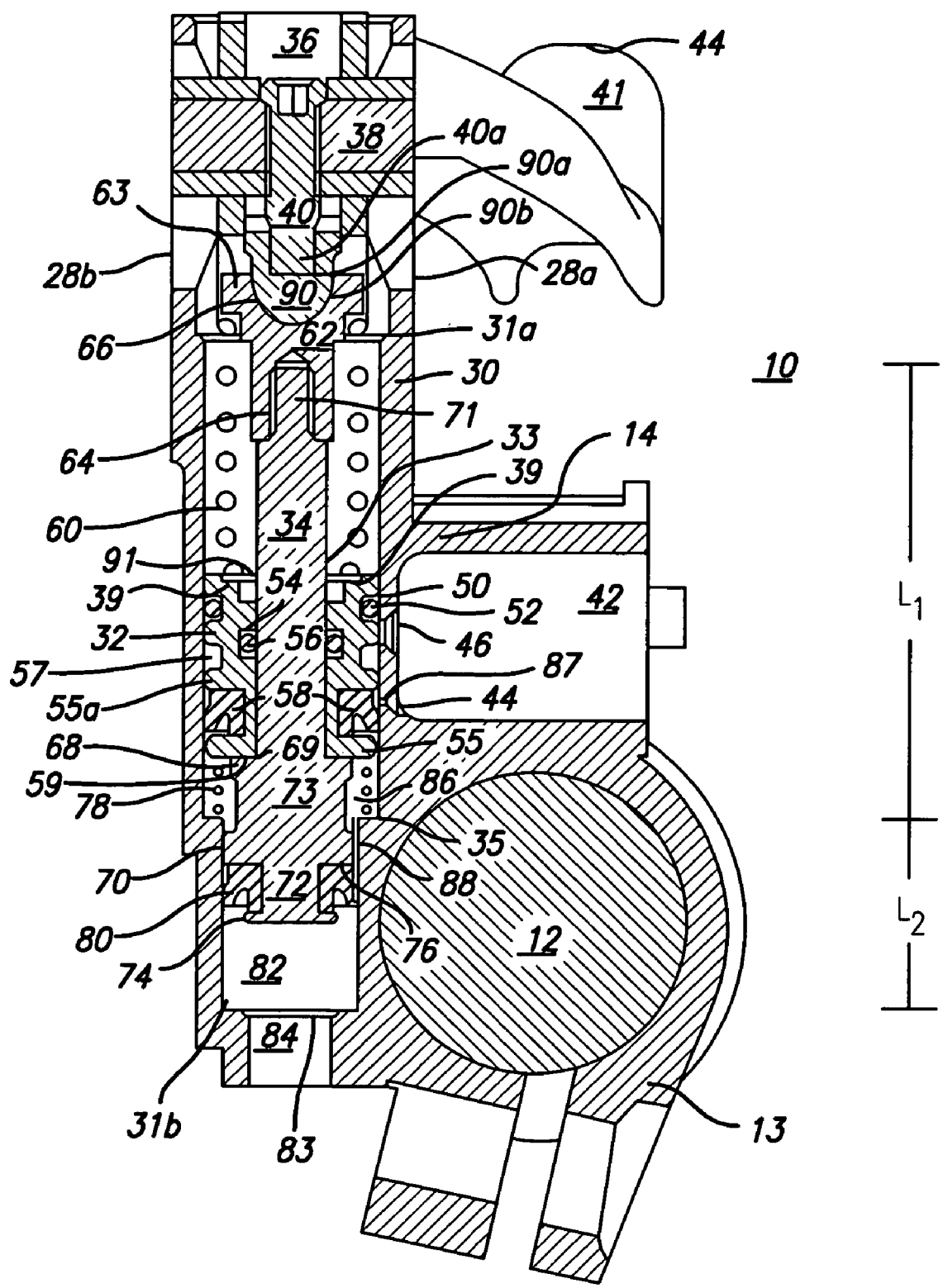
FIG. 4 is a cross-sectional view of the hydraulic disc brake lever assembly of FIG. 1 with the lever in a first actuating position.
Figure 5:
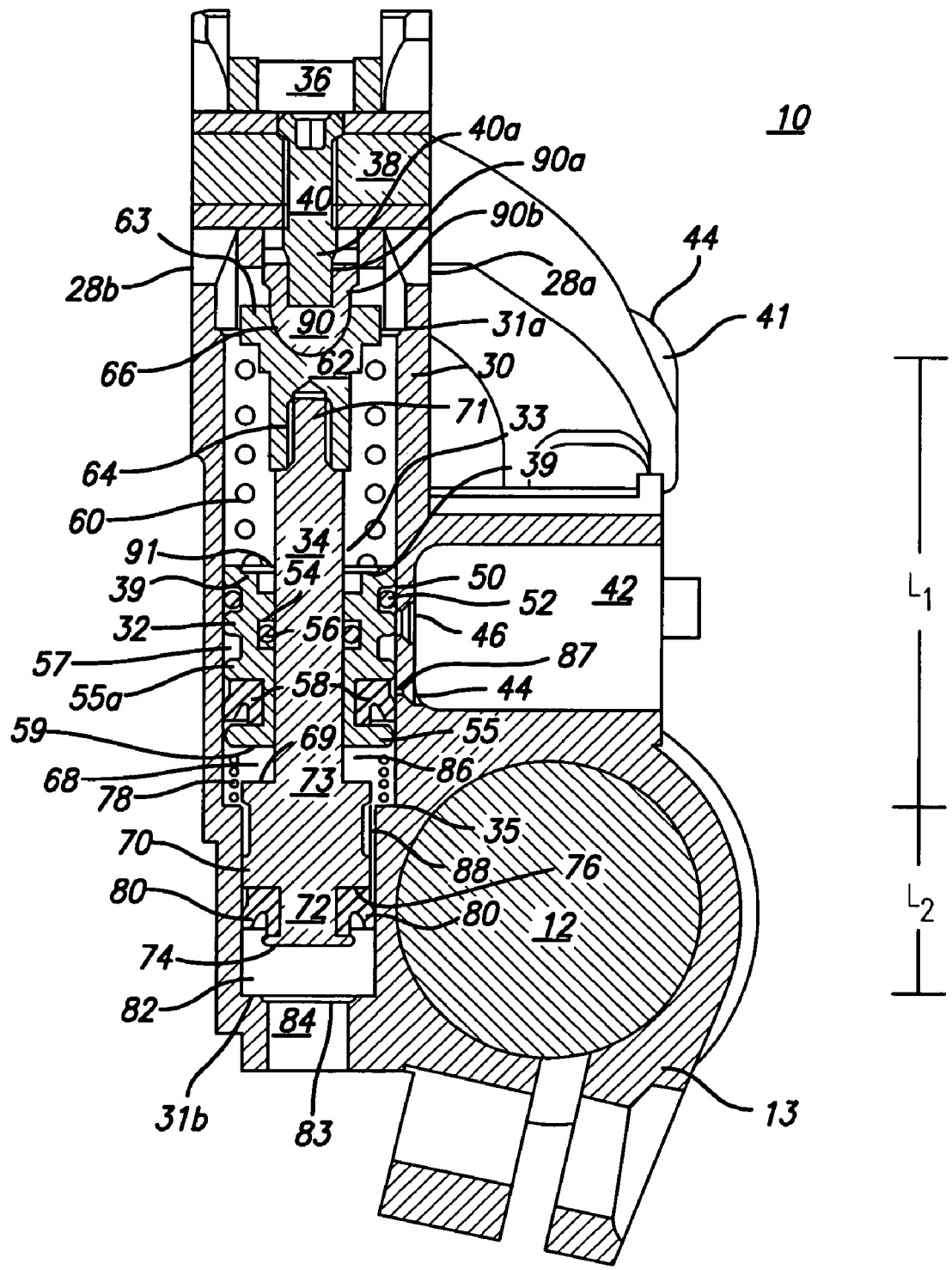
FIG. 5 is a cross-sectional view of the hydraulic disc brake lever assembly of FIG. 1 with the lever in a second actuating position.

FIGS. 3–5 show a cross-sectional view of a preferred embodiment of the brake lever assembly 10 of the present invention. The cross-sectional views of FIGS. 3–5 are taken along line III—III in FIG. 1. The three different views of FIGS. 3–5 represent different positions of lever 41 with respect to housing 14 and handlebar 12. FIG. 3 depicts lever 41 in a natural or non-actuating position. FIG. 4 depicts lever 41 in a first actuatiny position, and FIG. 5 depicts lever 41 in a second actuating position.

As will be described below, the movement of lever 41 from the neutral position to the first and second actuating positions is preferably used to force hydraulic fluid from brake lever assembly 10 to a hydraulic disc brake system. The present invention may be used with a number of different systems, including bicycle hydraulic disc brake systems such as those described in U.S. Pat. No. 6,491,144 (the "'144 Patent"), the entirety of which is incorporated herein by reference. However, the present invention is not limited to any particular hydraulic system or hydraulic disc brake system. Thus, the disclosure of the '144 Patent is referenced herein to illustrate a preferred embodiment of the present invention only. As shown in FIG. 16 of the '144 Patent, hydraulic disc brake systems typically comprise a caliper housing and one or more slave pistons which are movable in response to changes in hydraulic fluid pressure applied via hydraulic fluid conduits in the caliper housing. As is also shown, the slave pistons typically include a friction member, such as a brake pad.

FIG. 16 of the '144 Patent shows such a hydraulic disc brake system in use on a bicycle. As indicated, in bicycle applications the caliper housing is typically placed proximate a bicycle rotor which is mounted on and rotates with a front or rear wheel of the bicycle. The brake pads are typically positioned on opposite sides of the rotor. When braking is desired, hydraulic pressure is applied to the slave pistons to force the friction members to contact the rotor. The frictional resistance of the friction members against the rotor causes the bicycle wheel to rotate more slowly and eventually to stop rotating.

In a preferred embodiment of the present invention, a master cylinder assembly 30 is provided which is connected to a bicycle hydraulic disc brake system. Master cylinder assembly 30 preferably provides for mutli-stage braking, which more preferably is two-stage or dual-stage braking. In an especially preferred embodiment, during the first stage of braking, lever 41 is pulled through a first region of its range of travel, such that the master cylinder assembly causes the friction member or brake pad to come into contact with the rotor. This first region generally comprises from about 30 percent to about 70 percent of the lever's total range of travel, preferably comprises from about 40 percent to about 60 percent of the total range of travel and more preferably comprises from about 45 percent to about 55 percent of the total range of travel.

In the second stage of braking, lever 41 is pulled through a second region of its range of travel, causing the friction members to provide increasing amounts of pressure and frictional resistance to the rotor.

A preferred embodiment of a master cylinder assembly 30 shown in FIGS. 3–5 will now be described. Second housing section 26 includes a master cylinder 31 which is generally a cylindrical space defined in housing 14 having a top end 31a and a bottom end 31b. In an especially preferred embodiment, master cylinder 31 comprises two lengthwise regions, L1 and L2, wherein the L1 region has a diameter and a cross-sectional area that is greater than in the L2 region. The use of a master cylinder with two different diameters facilitates the creation of two hydraulic fluid containing regions, and consequently, the ability to provide two-stage braking as will be evident from the embodiments described below.

Master cylinder 31 houses a master piston assembly 33 which comprises first piston 32 and a second piston 34. In a preferred embodiment, first piston 32 is operatively connected to second piston 34, preferably via a longitudinal opening in which a portion of second piston 34 is concentrically disposed.

To operatively connect lever 41 to master piston assembly 33, one or more coupling members are preferably provided. A variety of different coupling member configurations and geometries may be used, and those shown in FIGS. 3–5 are merely preferred. In the embodiment of FIGS. 3–5, male-female coupling member 90 connects fastener 40 to dual female coupling member 62. Female portion 90a of male-female coupling member 90 is preferably sized to provide a tight fit with fastener 40 using known means. For example, fastener 40 may have an externally threaded end 40a which threadably engages a complementary set of internal threads formed on the internal surface of the female portion 90a. In addition, fastener 40 may be connected to male-female coupling member 90 by other means such as welding or gluing.

Male end 90b of male-female coupling member 90 is preferably connected to a wide connection 66 on dual female coupling member 62 by known attachment methods. In a preferred embodiment, male end 90b is press-fit into wide connection 66 of dual female coupling member 62.

Dual female connector 62 also preferably includes a narrow connection portion 64 which receives an upper end 71 of second piston 34. It is preferred that narrow connection portion 64 is internally threaded to engage complementary threads which are formed on upper end 71 of second piston 34. Thus, in the preferred embodiment of FIGS. 3–5, lever 41 is operatively connected to second piston 34 via actuating member 38, fastener 40, male-female coupling member 90 and dual female coupling member 62. As a result, the pivotal movement of lever 41 about pivot member 22 causes second piston 34 to move along the axial direction of master cylinder 31.

As indicated in FIGS. 3–5, a first fluid containing region 82 is defined within master cylinder 31 proximate its bottom end 31b. As second piston 34 is moved due to the pivotal movement of lever 41, fluid in first fluid containing area 82 is displaced through exit port 83 into hydraulic conduit attachment 84. Hydraulic conduit attachment 84 is preferably designed to be attachable to a hydraulic conduit such as a hose which may then be connected to a disc brake caliper. If the brake lever assembly 10 is connected to a disc brake assembly such as the one depicted in FIG. 16 of the '144 Patent, the displacement of hydraulic fluid into such a hydraulic conduit causes fluid to move into the fluid conduits of the caliper housing (e.g., conduits 37 in FIG. 16 of the '144 Patent).

As mentioned earlier, the present invention preferably provides for two-stage braking when brake lever assembly 10 is connected to a hydraulic disc brake assembly. In the embodiments of FIGS. 1–5, this two-stage braking is facilitated by the operative connection of first piston 32 and second piston 34.

Referring to FIG. 3, first piston 32 is generally annular in shape, preferably having an opening, more preferably a through-hole 51, running along its longitudinal axis. First piston 32 is preferably sized to closely fit within master cylinder 31 while still being movable with respect to it.

In the preferred embodiment of FIGS. 3–5, a portion of second piston 34 is disposed in through-hole 51. Through-hole 51 is preferably sized to create a relatively close fit with the outer surface of second piston 34, while allowing second piston 34 to move within through-hole 51 in the manner described below. Second piston 34 also projects through flat sealing member 91 at the top end of first piston 32. Flat sealing member 91 is preferably a gasket and is included to aid in sealing master piston assembly 33 from an upper portion of master cylinder 31 lying above the outer piston, thereby reducing the likelihood that hydraulic fluid will leak from housing 14. As shown in the figures, first piston 32 includes a radially inward lip 39 against which flat sealing member 91 is seated to aid in holding flat sealing member 91 in place.

First piston 32 preferably has a first circumferential groove 50 around its outer circumference. An O-ring seal 52 or other suitable means preferably provides a seal between first piston 32 and master cylinder 31 while allowing first piston 32 to move within master cylinder 31. First piston 32 also preferably includes a second circumferential groove 54 around the inner surface defined by through-hole 51. O-ring 56 is provided to aid in maintaining a seal between the two pistons, 32 and 34, while allowing second piston 34 to move with respect to first piston 32. In addition, open circumferential groove 57 is preferably provided around the outer surface of first piston 32 to reduce the amount of friction between first piston 32 and master cylinder 31. First piston 32 also preferably includes a lower flange 55 and an opposing middle flange 55a which along with master cylinder 31 define an annular space around the lower portion of first piston 32. A seal 58, which is preferably a cup seal or umbrella seal, is snugly fit into the annular space.

Second piston 34 includes a lower end 73 having an upper flange 68 a middle flange 70 and a lower neck 72. Lower neck 72 includes a fluid contacting flange 74 which is in contact with hydraulic fluid in first fluid containing area 82. It is preferred that middle flange 70 have an outer diameter that is greater than that of lower neck 72 and fluid contacting flange 74, thereby creating an annular space defined by master cylinder 31, lower neck 72, middle flange 70 and fluid contacting flange 74. A seal 80, which is preferably a cup seal or an umbrella seal, is disposed within this annular space.

Referring again to FIG. 3, second piston upper flange 68 preferably includes a first piston contacting surface 69. When lever 41 is in the neutral position, first piston contacting surface 69 abuts a complementary second piston contacting surface 59 on outer piston lower flange 55. In addition upper flange 68 and middle flange 70 of second piston 34 preferably have smaller diameters than the L1 portion of master cylinder 31, as does the portion of lower end 73 lying between flanges 68 and 70. The relative difference facilitates the creation of a second fluid containing region 86. As shown in FIGS. 3–5, second fluid containing region 86 is an annular space that is preferably located above first fluid containing region 82. It is especially preferred that the second fluid containing region 86 have a cross-sectional area (i.e., an area perpendicular to the lengthwise axis of master cylinder 31) that is less than the cross-sectional area of first fluid containing region 82.

Second fluid containing region 86 preferably includes a biasing device such as a spring 78 for biasing first piston 32 away from master cylinder bottom end 31b. As the figures indicate, the master cylinder's change in diameter from region L1 to region L2 creates a radially inward projecting lip 35. Spring 78 preferably concentrically surrounds second piston 34 such that one end abuts lip 35 and the other end abuts first piston lower flange 55. Because housing 14 remains fixed relative to handlebar 12, lip 35 remains fixed, allowing spring 78 to bias first piston 32 away from master cylinder bottom end 31b.

The embodiment of FIGS. 3–5 also preferably includes a biasing device such as a spring 60 for biasing first piston 32 away from dual female coupling member 62. Spring 60 is preferably concentrically positioned about dual female coupling member 62 and second piston 34. In a preferred embodiment, dual female coupling member 62 includes outer flange 63. One end of spring 60 is seated against the bottom surface of outer flange 63. As mentioned above, flat sealing member 91 is preferably concentrically positioned around second piston 34 and seated against radially inward projecting lip 39 of first piston 32. The end of spring 60 that is opposite dual female coupling member 62 is preferably seated against flat sealing member 91 or the area of first piston 32 adjacent to it. As a result, spring 60 preferably biases first piston 32 away from dual female coupling member 62. Thus, as lever 41 is moved towards handlebar 12, actuating member 38 is displaced towards master cylinder bottom end 31b. Because fastener 40 is connected to actuating member 38, the two components move together. As fastener 40 moves, male-female coupling member 90 and dual female coupling member 62 move with it. Because of the engagement of spring 60 with dual female coupling member 90 and flat sealing member 91 (or the adjacent portion of first piston 32), first piston 32 begins to move towards master cylinder bottom end 31b as lever 41 is moved from the neutral position of FIG. 3 to the first actuating position of FIG. 4.

Figure 6:
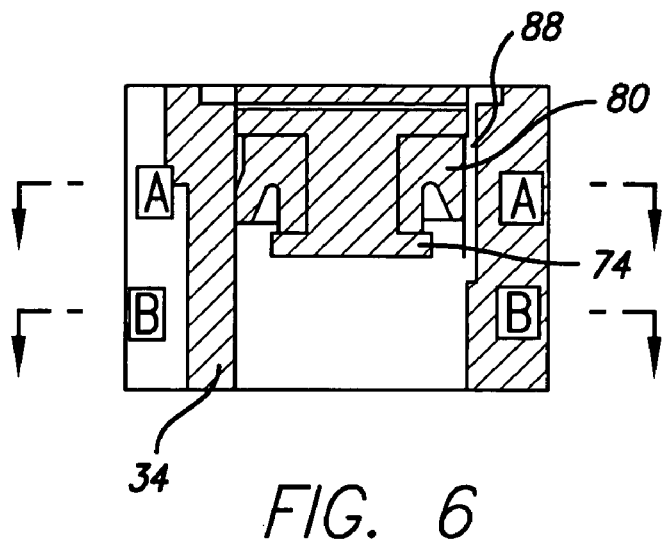
FIG. 6 is an detail view of a portion of FIG. 3.
Figure 7:
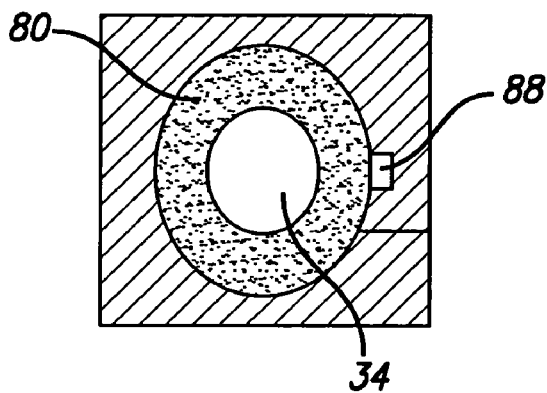
FIG. 7 is a cross-sectional view of FIG. 6 taken along the line A—A in FIG. 6.
Figure 8:
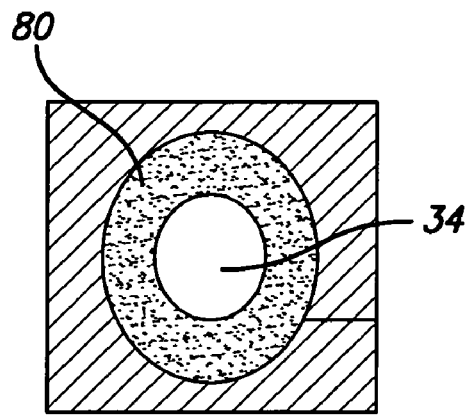
FIG. 8 is a cross-sectional view of FIG. 7 taken along the line B—B in FIG. 6.

It is preferred that housing 14 include a hydraulic fluid reservoir 42 for storing hydraulic fluid. Two ports, a timing port 44 and a compensating port 46 are preferably provided to allow hydraulic fluid to flow between reservoir 42 and master cylinder 31. As best shown in FIGS. 3–5, first fluid passage 87 connects reservoir 42 to second fluid containing area 86. As best shown in FIGS. 6–8, a second fluid passage 88 connects second fluid containing area 86 and first fluid containing area 82. Thus, when lever 41 is in the neutral position as shown in FIG. 3, timing port 44 is in fluid communication with first fluid containing area 82 and fluid conduit attachment 84 via first fluid passage 87, second fluid containing area 86 and second fluid passage 88.

If a hydraulic disc brake is attached to lever assembly 10, when lever 41 is in the neutral position of FIG. 3 or farther away from handlebar 12, the total liquid volume of the hydraulic brake system will include the volume of reservoir 42. As a result, the pressure at second fluid containing area and hydraulic fluid conduit 84 will be relatively low. However, as lever 41 is moved to the first actuating position shown in FIG. 4, the operative connection between lever 41, and first piston 32 causes first piston 32 and seal 58 to move towards master cylinder bottom end 31b. When seal 58 reaches timing port 44, first fluid passage 87 is substantially isolated from timing port 44 and reservoir 42. At this point, the overall hydraulic system volume which is available for actuating the brake system is reduced, and the system pressure begins to correspondingly increase. If the attached disc brake's fluid conduits are already liquid full, further movement will move the slave piston(s) and the attached brake pads, towards the rotor.

As indicated above, first and second pistons 32 and 34 preferably move together when lever 41 is between the neutral and first acutating positions. To facilitate this movement, spring 60 is preferably selected such that it applies greater force to outer piston 32 than does second spring 78 as lever 41 is moved from the neutral position to the first actuating position. It is especially preferred that spring 60 have a spring constant or stiffness that is greater than spring 78, wherein the stiffness or spring constant is defined by the relationship k=F/x, with F being equal to the force required to linearly compress the spring a distance x. As a result of the differential spring strengths, as lever 41 is moved from the neutral position of FIG. 3 to the first actuating position of FIG. 4, second piston engagement surface 59 of first piston flange 55 will abuttingly engage first piston engaging surface 69 of second piston 32, causing first piston 32 to move towards master cylinder bottom end 31b along with second piston 34. Accordingly, fluid will be displaced from second fluid containing region 86 to first fluid containing region 82 via second fluid passage 88 and from first fluid containing region 82 to hydraulic fluid conduit attachment 84 via exit port or fluid outlet 83.

As will be apparent to those of ordinary skill in the art, as lever 41 is moved from the neutral position of FIG. 3 to the first actuating position of FIG. 4, the volume of hydraulic fluid displaced to the exit port or fluid outlet 83 of master cylinder 31 will equal the sum of the volumes of fluid displaced from the first and second fluid containing regions 82 and 86. In a preferred embodiment, as lever 41 is moved from the neutral position to the first actuating position, at least one of the friction members or brake pads of an attached disc brake system will move from a position in which it does not contact the rotor to one in which it contacts the rotor. It is especially preferred that once the first actuating position of FIG. 4 is reached, the brake pad will have just come into contact with the rotor without applying appreciable pressure to it. One skilled in the art will readily appreciate how to select the dimensions of master cylinder 31, pistons 32 and 34, hydraulic conduit 84 and the disc brake caliper components to obtain a brake lever and brake system in which the brake pad contacts the rotor without applying appreciable pressure once lever 41 reaches the first actuating position.

As indicated in FIG. 4, once lever 41 reaches the first actuating position, first piston 32 will be at a threshold distance from the master cylinder top end 31a at which seal 80 will preferably close off the outlet of second fluid passage 88. Closure of the outlet of second fluid passage 88 will substantially isolate first fluid containing region 82 from second fluid containing region 86. As a result, negligible or no hydraulic fluid will enter or leave second fluid containing region 86. Because the volume of fluid in second fluid containing region 86 will be substantially fixed and because liquids such as known hydraulic fluids are substantially incompressible, second piston engagement surface 59 of first piston 32 will be biased away from first piston engagement surface 69 of second piston 34 and towards the top end 31a of master cylinder 31. As best shown in FIG. 5, at this point, further movement of lever 41 towards handlebar 12 will cause second piston 34 to separate from first piston 32, such that second piston 34 moves towards master cylinder bottom end 31b, while first piston 32 remains substantially stationary. Thus, the distance from master cylinder top end 31a to the outlet of second fluid passage 88 effectively defines a first movement region along the length of master cylinder 31, such that when master piston assembly 33 is within the first movement region, first piston 32 and second piston 34 move together. However, once second piston 34 begins to exit the first movement region and is at least partially outside of it, second piston 34 moves with respect to first piston 32.

If brake lever assembly 10 is attached to a hydraulic disc brake, once the brake pads contact the rotor, the volume of liquid which can be displaced from master cylinder 31 will be relatively small. Because typical hydraulic fluids are substantially incompressible, further movement of inner piston 34 towards master cylinder bottom end 31b will increase the system hydraulic pressure and the frictional force applied to the rotor. However, some liquid will be displaced from master cylinder 31 even after the brake pads contact the rotor due to a variety of factors such as the compressibility of the brake pads, the expansion or extension of the hydraulic conduit, which is typically a flexible hose, or due to system leakage.

A preferred embodiment of a method of using a hydraulic disc brake lever assembly 10 made in accordance with the foregoing embodiments will now be described. In accordance with the method, a bicycle is provided having a rotor on its front or back wheel. A hydraulic disc brake caliper, for example the caliper of FIG. 16 in the '144 Patent, is attached to the wheel to which the rotor is attached such that its brake pads are positioned on either side of the rotor.

In accordance with the method, the bicycle is provided with a hydraulic disc brake lever assembly 10 attached to a handlebar 12. At some point when the bicyclist is riding the bicycle, he or she will want to slow or stop the bicycle by applying the brakes. At that time, the rider will grip handlebar 12 and will also grip lever 41 in relatively flat region 41a. As indicated earlier, handlebar 41 is preferably configured to restrict the rider's lateral movement of his or her hand along the length of the lever 41. The rider will then contract lever 41 towards handlebar 12 at a substantially constant rate of speed. Due to the operative connection of lever 41 and master piston assembly 33, first piston 32 and second piston 34 will begin to move towards bottom end 31b of master cylinder 31 while remaining within the first movement region defined by the master cylinder top end 31a and the outlet of fluid passage 88. During this motion of lever 41, hydraulic fluid will be displaced from second fluid containing region 86 into first fluid containing region 82 and from first fluid containing region 82 to hydraulic conduit attachment 84. As a result, hydraulic fluid will begin to fill the hydraulic fluid conduits within the caliper housing (unless the caliper housing conduits are already liquid full). Once the conduits are full of hydraulic fluid, pressure will be applied to the disc brake slave pistons, moving them towards the rotor. During this time, no braking will occur.

The rider will preferably continue to contract lever 41 at the same substantially constant rate of speed. As he or she continues to do so, lever 41 will reach a first actuating position (see FIG. 4), at which time first piston 32 will preferably reach a threshold distance from master cylinder top end 31a. Cup seal 80 will then preferably close off the outlet of second fluid passage 88 from second fluid containing region 86. At this point, the volume of fluid contained in second fluid containing region 86 will be substantially fixed, and as a result, the fluid will begin to bias first piston 32 towards master cylinder top end 31a. Thus, further movement of lever 41 towards handlebar 12 will cause second piston 34 to separate from first piston 32 and move towards master cylinder bottom end 31b as it exits the first movement region of master cylinder 31 (see FIG. 5). However, first piston 32 will remain substantially stationary. Also, once lever 41 reaches its first actuating position, the brake pads will preferably make contact the rotor without applying appreciable pressure to it. A first volume of hydraulic fluid, V1, will be displaced during this first movement of lever 41 from the neutral position to the first actuating position.

The rider will preferably continue to contract lever 41 from the first actuating position to the second actuating position at the same rate of speed used to contract the lever from the neutral position to the first actuating position. At this point, because the brake pads are in contact with the rotor, the system pressure will begin to rise and the frictional resistance applied by the brake pads to the rotor will increase. Because second fluid containing region 86 will be substantially isolated from first fluid containing region 82, the total volume of hydraulic fluid delivered from lever assembly 10 to the disc brake caliper housing, as lever 41 is moved from the first actuating position to the second actuating position, V2, will be less than V1. Thus, according to the preferred embodiment of this method, a larger amount of fluid is delivered in the first region of travel of brake lever 41 than in a second region of travel. In an especially preferred embodiment, the method will provide two-stage braking in which the ratio of fluid volume displaced from master cylinder assembly 31 to lever travel will vary as lever 41 is contracted towards handlebar 12. As those skilled in the art will appreciate, for a given displacement of lever 41 within the first region of its range of travel, a greater volume of hydraulic fluid will be discharged from master cylinder assembly 31 than when lever 41 is displaced the same distance within the second region.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A master cylinder assembly comprising:
a master cylinder having a length defining an axis, a top end and a bottom end, the master cylinder further defining a threshold distance along the axis from the top end of the master cylinder;
a first piston disposed in and movable within the master cylinder, the first piston defining a distance along tie axis from the top end of the master cylinder; and
a second piston disposed in and movable within the master cylinder, the second piston being operatively connected to the first piston;
wherein when the distance from the first piston to the top end of the master cylinder is at least the threshhold distance, the second piston is movable with respect to the first piston, and
wherein the second piston has a first piston engagement surface, the first piston has a second piston engagement surface, and the second piston engagement surface abuttingly engages the first piston engagement surface when the distance from the first piston to the top end of the master cylinder is less than the threshold distance.

2. A master cylinder assembly comprising:
a master cylinder having a length defining an axis, a top end and a bottom end, the master cylinder further defining a threshold distance along the axis from the top end of the master cylinder;
a first piston disposed in and movable within the master cylinder, the first piston defining a distance along the axis from the top end of the master cylinder; and
a second piston disposed in and movable within the master cylinder, the second piston being operatively connected to the first piston;
wherein when the distance from the first piston to the top end of the master cylinder is at least the threshold distance, the second piston is movable with respect to the first piston, and wherein the master cylinder further comprises a first fluid containing region having a fluid outlet; the first piston, second piston, and master cylinder define a second fluid containing region, and when the distance from the first piston to the top end of the master cylinder is less than the threshold distance, the first fluid containing region is in fluid communication with the second fluid containing region.

3. The master cylinder assembly of claim 2, wherein when the distance from the first piston to the top end of the master cylinder is at least the threshold distance, the first fluid containing region is substantially not in fluid communication with the second fluid containing region.

4. The master cylinder assembly of claim 3, wherein the second fluid containing region contains a fluid, and when the distance from the first piston to the top end of the master cylinder is it least the threshold distance, the fluid in the second fluid containing region biases the first piston toward the top end of the master cylinder.

5. The master cylinder assembly of claim 4, further comprising a coupling member for operatively connecting the second piston to a bicycle brake lever, wherein the coupling member is biased away from the first piston.

6. A master cylinder assembly comprising:
a master cylinder having a top end, a bottom end, and a length, the master cylinder further defining a first movement region along a first portion of its length;
a master piston assembly, comprising first and second pistons, the first and second pistons being disposed in and movable within the master cylinder; and
a first biasing device positioned between the top end of the master cylinder and the first piston, wherein the first biasing device is configured to bias the first piston away from the top end of the master cylinder;
wherein when the master piston assembly is located within the first movement region, the first piston is movable together with the second piston and when the master piston assembly is at least partially outside of the first movement region, the second piston is movable with respect to the first piston, wherein the master piston assembly is movable within the first movement region before the master piston assembly is movable outside of the first movement region.

7. A master cylinder assembly comprising:
a master cylinder having a top end, a bottom end, and a length, the master cylinder further defining a first movement region along a first portion of its length, wherein the master cylinder further comprises a first lengthwise region along a second portion of its length having a first cross-sectional area, and a second lengthwise region along a third portion of its length having a second cross-sectional area, and the first cross-sectional area is greater than the second cross-sectional area, and wherein the first and second lengthwise regions are shaped to cooperatively define a projecting lip;
a master piston assembly comprising first and second pistons, the first and second pistons being disposed in and movable within the master cylinder;
wherein when the master piston assembly is located within the first movement region, the first piston is movable together with the second piston and when the master piston assembly is at least partially outside of the first movement region, the second piston is movable with respect to the first piston, wherein the master piston assembly is movable within the first movement region before the master piston assembly is movable outside of the first movement region, and a first biasing device positioned between the top end of the master cylinder and the first piston, wherein the first biasing device is configured to bias the first piston away from the top end of the cylinder.

8. A master cylinder assembly comprising:
a master cylinder having a top end, a bottom end, and a length, the master cylinder further defining a first movement region along a first portion of its length wherein the master cylinder further comprises a first lengthwise region along a second portion of its length having a first cross-sectional area, and a second lengthwise region along a third portion of its length having a second cross-sectional area, and the first cross-sectional area is greater than the second cross-sectional area, and wherein the first and second lengthwise regions are shaped to cooperatively define a projecting lip, wherein the master cylinder further comprises a fluid passage for transmitting fluid from the first lengthwise region to the second lengthwise region; and
a master piston assembly, comprising first and second pistons, the first and second pistons being disposed in and movable within the master cylinder;
wherein when the master piston assembly is located within the first movement region, the first piston is movable together with the second piston and when the master piston assembly is at least partially outside of the first movement region, the second piston is movable with respect to the first piston, wherein the master piston assembly is movable within the first movement region before the master piston assembly is movable outside at the first movement region.

9. A master cylinder assembly comprising:
a master cylinder having a top end, a bottom end, and a length, the master cylinder further defining a first movement region along a first portion at its length; and
a master piston assembly, comprising first and second pistons, the first and second pistons being disposed in and movable within the master cylinder;
wherein when the master piston assembly is located within the first movement region, the first piston is movable together with the second piston and when the master piston assembly is at least partialy outside of the first movement region, the second piston is movable with respect to the first piston, wherein the master piston assembly is movable within the first movement region before the master piston assembly is movable outside of the first movement region, and wherein the second piston has a first piston engagement surface, the first piston has a second piston engagement surface, and the second piston engagement surface abuttingly engages the first piston engagement surface when the master piston assembly is within the first movement region.

10. A hydraulic brake lever system, comprising:
a lever having a range of travel comprising a first region followed by a second region;
a master cylinder assembly having hydraulic fluid contained therein and a fluid exit port, the lever being operatively connected to the master cylinder assembly;
wherein when the lever is in the first region, moving the lever a distance delivers a first volume of hydraulic fluid from the exit port, when the lever is in the second region, moving the lever the distance delivers a second volume of hydraulic fluid from the exit port, and the first volume is greater than the second volume.

11. A method of operating a master cylinder assembly comprising
a master cylinder having a top and a bottom, first and second pistons disposed in the master cylinder, and a projecting lip defined in the master cylinder at a point between the top and bottom, the method comprising the steps of moving the first and second pistons together within the master cylinder, engaging one of the first and second pistons with the projecting lip, and then moving one of the first and second pistons with respect to the other of the first and second pistons.

* * * * *